(12) United States Patent
Myeong et al.

(10) Patent No.: US 8,630,735 B2
(45) Date of Patent: *Jan. 14, 2014

(54) METHOD, APPARATUS, AND MEDIUM FOR ESTIMATING POSE OF MOBILE ROBOT USING PARTICLE FILTER

(75) Inventors: Hyeon Myeong, Yongin-si (KR);
Seok-won Bang, Seoul (KR);
Dong-geon Kong, Yongin-si (KR);
Su-jinn Lee, Yongin-si (KR)

(73) Assignee: Samsumg Electronics Co., Ltd., Suwon-Si (KR)

(*) Notice: Subject to any disclaimer, the term of this patent is extended or adjusted under 35 U.S.C. 154(b) by 13 days.

This patent is subject to a terminal disclaimer.

(21) Appl. No.: 13/269,027

(22) Filed: Oct. 7, 2011

(65) Prior Publication Data
US 2012/0029698 A1 Feb. 2, 2012

Related U.S. Application Data

(63) Continuation of application No. 11/898,779, filed on Sep. 14, 2007, now Pat. No. 8,055,382.

(30) Foreign Application Priority Data

Nov. 16, 2006 (KR) .................. 10-2006-0113440

(51) Int. Cl.
*G05B 19/18* (2006.01)

(52) U.S. Cl.
USPC ........... 700/253; 700/245; 700/250; 700/256; 700/259; 701/23; 701/25; 701/26

(58) Field of Classification Search
USPC ............ 700/245, 253, 258, 259, 250; 701/23, 701/25, 26, 207, 208; 901/1, 46, 47
See application file for complete search history.

(56) References Cited

U.S. PATENT DOCUMENTS

| 4,645,348 A | 2/1987 | Dewar et al. |
| 6,667,592 B2 | 12/2003 | Jacobs et al. |
| 7,536,029 B2 | 5/2009 | Choi et al. |

(Continued)

FOREIGN PATENT DOCUMENTS

| JP | 2003-326484 | 11/2003 |
| JP | 2006-123161 | 5/2006 |
| WO | WO 98/35206 | 8/1998 |

OTHER PUBLICATIONS

U.S. Office Action mailed Feb. 1, 2011 in the file history of U.S. Appl. No. 11/898,779.

(Continued)

*Primary Examiner* — John Q Nguyen
*Assistant Examiner* — Jordan S Fei
(74) *Attorney, Agent, or Firm* — Staas & Halsey LLP

(57) ABSTRACT

Disclosed is a method, apparatus, and medium for estimating a pose of a moving robot using a particle filter. A method for estimating a pose of a moving robot using a particle filter according to an embodiment of the invention includes a detecting a change in pose of the mobile robot and calculating a pose of the current particle by applying the detected change in pose to the previous particle, predicting the probability of the pose of the current particle and obtaining a weight of the current particle on the basis of range data obtained by a sensor and map information, resampling the current particle on the basis of the weight, and adjusting the weight in consideration of an error of the sensor.

19 Claims, 8 Drawing Sheets

(56) References Cited

U.S. PATENT DOCUMENTS

2004/0167670 A1 8/2004 Goncalves et al.
2006/0075422 A1 4/2006 Choi et al.
2008/0119961 A1 5/2008 Myeong et al.

OTHER PUBLICATIONS

U.S. Notice of Allowance mailed Sep. 1, 2011 in the file history of U.S. Appl. No. 11/898,779.
Dirk Hähnel et al., "Map Building with Mobile Robots in Populated Environments", *University of Freigberg, Department of Computer Science, Germany*. (6 pages).
Giorgio Grisetti et al., "Improving Grid-based SLAM with Rao-Blackwellized Particle Filters by Adaptive Proposals and Selective Resampling", *Proceedings of the 2005 IEEE (International Conference on Robotics and Automation*, Barcelona, Spain, Apr. 2005), pp. 2443-2448.
Grisetti et al. "Speeding-up Rao-Blackwellized SLAM", IEEE International Conference, May 15-19, 2006, pp. 442-447.
Grisetti et al. "Improved Techniques for Grid Mapping with Rao-Blackwellized Particle Filters", IEEE Transactions on Robotics, Feb. 2007, vol. 23, No. 1, pp. 34-46.
Censi, Scan Matching in a Probabilistic Framework, IEEE International Conference, May 15-19, 2006, pp. 2291-2296.
Hahne et al., "Map Buildings with Mobile Robots in Populated Environments", IEE/RSJ International Conference on Intelligent Robots and Systems, Sep. 30-Oct. 4, 2002, vol. 1of 3, pp. 496-501.
Schulz et al. "Tracking Multiple Moving Targets With a Mobile Robot Using Particle Filters and Statistical Data Association", Proceedings of the IEEE International Conference on Robotics and Automation, May 21, 2001, vol. 1 of 4, pp. 1665-1670.
Kwok et al., "Bearing-only SLAM in Indoor Environments Using a Modified Particle Filter," In Proc. Australastion Converence on Robotics and Automation, 2003.
Kurth et al., "Experimental Results in Range-Only Localization with Radio," In Proc. 2003 IEEE/RSJ Int'l Conference on Intelligent Robots and Systems, 2003, pp. 974-979.
European Search Report dated Mar. 19, 2008, issued in corresponding European Patent Application No. 07120844.1.
Japanese Office Action for related Japanese Patent Application No. 2007-295098, mailed on Jun. 19, 2012.

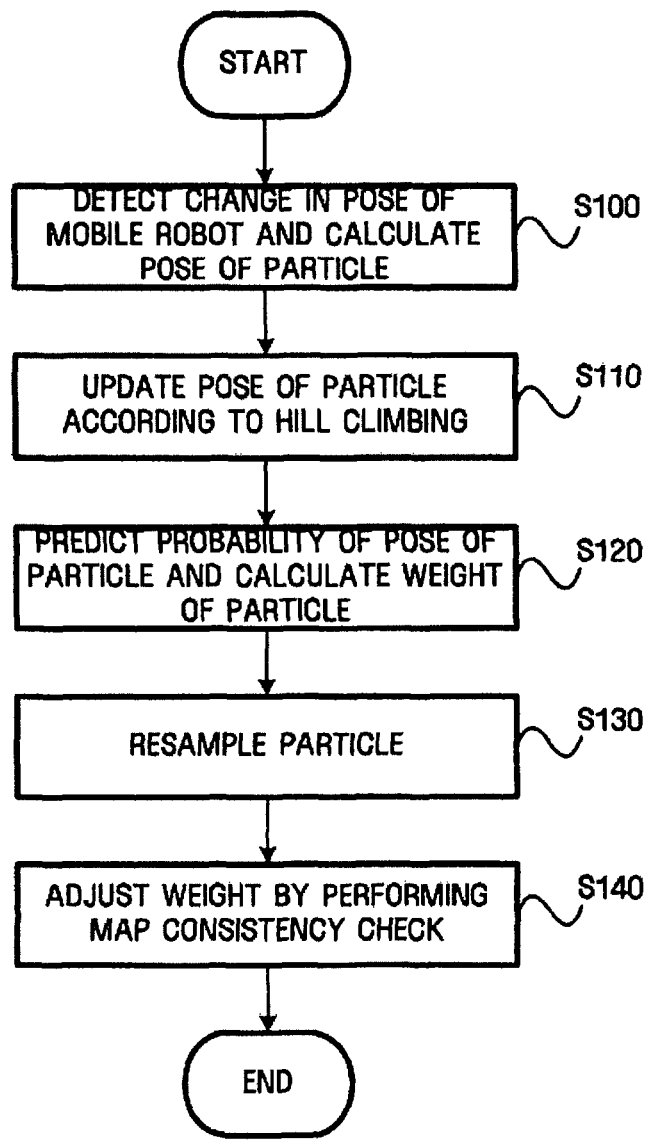

HILL CLIMBING

MODIFIED HILL CLIMBING

HILL CLIMBING

MODIFIED HILL CLIMBING

METHOD, APPARATUS, AND MEDIUM FOR ESTIMATING POSE OF MOBILE ROBOT USING PARTICLE FILTER

CROSS-REFERENCE TO RELATED APPLICATIONS

This application is a continuation application of U.S. patent application Ser. No. 11/898,779 filed on Sep. 14, 2007 now U.S. Pat. No. 8,055,382 in the U.S. Patent and Trademark Office. This application claims priority from U.S. patent application Ser. No. 11/898,779, the disclosure of which is incorporated by reference. This application also claims priority benefit from Korean Patent Application No. 10-2006-0113440 filed on Nov. 16, 2006 in the Korean Intellectual Property Office, the disclosure of which is incorporated herein by reference in its entirety.

BACKGROUND

1. Field

Embodiments relate to a method, apparatus, and medium for estimating a pose of a mobile robot using a particle filter, and more particularly, to a method, apparatus, and medium for estimating a pose of a mobile robot using a particle filter that is capable of accurately estimating the pose of the mobile robot by reflecting an error of a sensor in a grid-based simultaneous localization and map building (SLAM) algorithm using a particle filter and adjusting a weight.

2. Description of the Related Art

In recent years, in addition to robots for industrial use, robots for household use and robots for office services have been put to practical use. For example, there are cleaning robots, guiding robots, and security robots.

The robots perform functions on their own in a predetermined environment while moving within a predetermined area. In order that each of the robots moves and performs the function on its own in the predetermined environment, the robot needs to build a map of the surrounding space around the robot and information on the position and a heading angle of the robot. A grid-based simultaneous localization and mapping (SLAM) algorithm may be used as a method of building the map and recognizing the position of the robot.

According to the SLAM algorithm, a map of the surrounding area at a predetermined position is built, and on the basis of the built map, the position of the robot, where it has moved, is determined. These processes are repeated to thereby estimate the position of the robot and the map of the surroundings.

In the SLAM algorithm, a particle filter technique may be used to estimate the position of the robot itself. The particle filter technique is a method that is used to estimate the optimum pose of the robot by extracting a plurality of samples that predict the position and the head angle of the robot, and using the probability that each of the samples has an actual position and heading angle of the robot. The term "pose" in the invention indicates a two-dimensional coordinate position on the plane of the mobile robot and a heading angle of the mobile robot.

In a grid-based SLAM using range data, a map can be built by using all of the range data without extracting feature points. However, in the related art, a range finder (hereinafter, referred to as a "sensor") that has high accuracy needs to be used to obtain the range data. Therefore, the accuracy of the sensor is very important to obtain a good quality map.

For the robots for household use or the robots for business services, such as the cleaning robots and the security robots, which are put to practical use, even if the sensor is cheap and has relatively low accuracy, it is still necessary to build a map and accurately estimate the position of the robot.

SUMMARY

Embodiments increase the accuracy in estimating the pose of a mobile robot by adjusting a weight of a particle that is obtained by using a particle filter through a map consistency check.

Embodiments efficiently estimate a pose of a mobile robot by performing hill climbing according to a heading direction of the mobile robot.

According to an aspect of embodiments, there is provided a method for estimating a pose of a mobile robot using a particle filter, the method including sampling current particle on basis of initial position of the mobile robot, detecting a change in pose of the mobile robot and calculating pose of the current particle by applying the detected change in pose to the previous particle, predicting the probability of the pose of the current particle and obtaining a weight of the current particle on the basis of range data obtained by a sensor and map information, resampling the current particle on the basis of the weight, and adjusting the weight in consideration of an error of the sensor.

According to another aspect of embodiments, there is provided an apparatus for estimating a pose of a mobile robot using a particle filter, the apparatus including an odometer to detect a change in pose of the mobile robot, a particle pose calculating unit to calculate pose of the current particle by applying the detected change in pose to the previous particle, a sensor to obtain range data, a particle filter unit to predict the probability of the pose of the current particle and to obtain a weight of the current particle on the basis of the range data and map information, and a weight adjusting unit to adjust the weight in consideration of an error by the sensor.

According to another aspect of embodiments, there is provided a method for estimating a pose of a mobile robot using a particle filter, the method including detecting a change in pose of the mobile robot and calculating pose of the current particle by applying the detected change in pose to the previous particle; predicting the probability of the pose of the current particle and obtaining a weight of the current particle on the basis of range data obtained by a sensor and map information; and adjusting the weight in consideration of an error of the sensor in order to estimate the pose of the mobile robot.

According to another aspect, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIG. 1 is a flow chart illustrating a method of estimating a pose of a mobile robot using a particle filter according to an exemplary embodiment;

DETAILED DESCRIPTION OF EMBODIMENTS

Figure 2A:
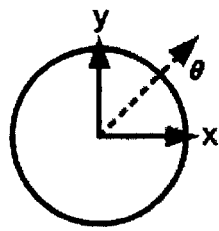
FIG. 2A is a view illustrating coordinate axes of a hill climbing method according to the related art, in which step sizes are the same on the basis of an absolute coordinate system.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a flow chart illustrating a method of estimating a pose of a mobile robot using a particle filter according to an exemplary embodiment.

A method for estimating a pose of a mobile robot using a particle filter according to one exemplary embodiment includes detecting a change in pose of the mobile robot and calculating a pose of the current particle by applying the detected change in pose to the previous particle (S100), updating the pose of the particle by a hill climbing technique (S110), predicting the probability of the pose and calculating a weight of the current particle on the basis of range data acquired by a sensor 620 and map information (S120), resampling the current particle on the basis of the weight (S130), and adjusting the weight in consideration of an error of the sensor 620 (S140).

In order to implement the method of estimating a pose of a mobile robot using a particle filter according to the embodiment of the present invention, the generation when the mobile robot builds a map while traveling will be described.

First, a position at which the mobile robot starts and a heading angle at which the robot heads are given. Alternatively, a position at which the mobile robot starts and a heading angle at which the mobile robot starts may be set as reference values. Since the term "pose" indicates a position on a two-dimensional plane of the mobile robot and a heading angle of the mobile robot, estimating the pose of the mobile robot denotes estimating the position and the heading angle of the mobile robot.

The mobile robot at the given starting point may move a predetermined distance. A change in the pose of the mobile robot, which has moved, can be detected by an odometer 600 that is mounted on the robot and is capable of detecting the amount of movement of the robot and a rotation angle of the robot. The odometer 600 may include, for example, an encoder and a gyroscope. For example, the distance and direction at which the robot has moved are integrated by the encoder to thereby estimate the pose of the current mobile robot. When there is no integral error, the pose of the robot can be estimated by the encoder only. The encoder provides relatively high accuracy within a short period, but the encoder incurs problems when integration is continuously performed on numbers, causing errors to be accumulated. Further, since the mobile robot may slide or encounter an obstacle while moving, the difference may occur between the position of the robot obtained on the basis of the encoder and the actual position.

Therefore, in order to estimate the pose of the robot more accurately, a simultaneous localization and mapping (SLAM) algorithm using a particle filter is used.

A sampling unit 640 randomly samples N particles at an initial stage. The sampling unit 640 selects the N random points around the initial position of the mobile robot. That is, N particles are selected by Equation 1 as follows.

$$S=\{(x_0^{(j)},w_0^{(j)})|j=1,\ldots,N\} \quad \text{[Equation 1]}$$

Here, $x_0^{(j)}$ and $w_0^{(j)}$ respectively indicate an initial position and an initial weight of the mobile robot with respect to a particle corresponding to a predetermined index j. The $w_0^{(j)}$ corresponding to each index may be set at 1/N regardless of the index j. The weight indicates probability that the position of the current particle becomes the position of the mobile robot.

When the robot moves the predetermined distance, it takes a predetermined time. Therefore, the pose of each of the particles over time can be updated.

A particle pose calculating unit 610 calculates the pose of each particle by applying the change in pose, which is detected by the above-described odometer 600 provided in the mobile robot, to the particle (S100).

At this time, in order to increase the accuracy of estimating the probability of the particle positions, the particle pose calculating unit 610 may update the pose of each of the particles by applying the hill climbing method (S110).

Figure 2B:
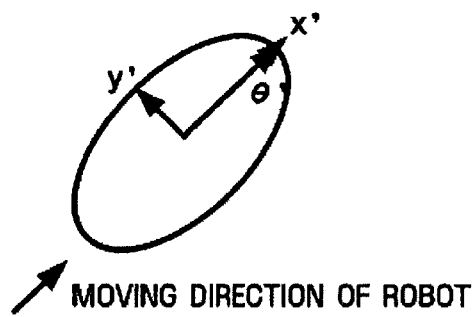
FIG. 2B is a view illustrating coordinate axes of a modified hill climbing method, in which step sizes are different on the basis of a relative coordinate system according to a heading angle of a robot.

FIG. 2A is a view illustrating coordinate axes of a hill climbing method according to the related art, in which step sizes are the same on the basis of an absolute coordinate system. FIG. 2B is a view illustrating coordinate axes of a modified hill climbing method, in which step sizes are different on the basis of a relative coordinate system according to a heading angle of a robot. FIG. 3 is a view illustrating particles on which hill climbing is performed according to the methods shown in FIGS. 2A and 2B.

As shown in FIG. 2A, in the hill climbing method according to the related art, changes (Δx, −Δx, Δy, and −Δy) caused by linear movement in four directions and changes (Δθ and −Δθ) caused by rotary movement in two directions on the basis of the absolute coordinate system are added to the pose of each of the particles that are obtained. That is, in the hill climbing method according to the related art, the six changes are added to the pose of the robot that each of the particles has so as to slightly change the pose of the particle, such that the position of the robot is changed in a direction where the position probability increases. The hill climbing method according to the related art is described in detail in G. Grisetti, C. Stachniss, and W. Burgard, "Improving grid-based slam with Rao-Blackwellized particle filters by adaptive proposals and selective resampling," In Proc. of the IEEE Int. Conf. on Robotics & Automation (ICRA), pp. 2443-2448, Barcelona, Spain, 2005, and D. Hähnel, D. Schulz, and W. Burgard, "Map building with mobile robots in populated environments," In Proc. of the IEEE/RSJ Int. Conf. on Intelligent Robots and Systems (IROS), 2002. Thus, the detailed description thereof will be omitted. A method of calculating the probability of the position of the robot will be described below.

The modified hill climbing method that is proposed by the present invention can update the pose of each of the particles on the basis of the heading angle of the robot. Therefore, as shown in FIG. 2B, instead of hill climbing on the basis of an absolute coordinate system, hill climbing is performed based on two axes, that is, an x' axis and a y' axis perpendicular to the x' axis in the relative coordinate system according to the heading angle of the robot.

Further, the hill climbing step size (corresponding to Δx and Δy in the related art) may not be set to a constant, but may be changed adaptively to an error covariance ellipse of a model of the odometer 600. This reflects the fact that the odometer 600 may generate a larger error in a direction where the robot moves, which reduces an amount of time necessary for performing the hill climbing and an error in the position of the particle. This will be defined as Equation 2.

$$\begin{bmatrix} x' \\ y' \end{bmatrix} = \begin{bmatrix} \sigma_x \cos\theta & \sin\theta \\ -\sin\theta & \sigma_y \cos\theta \end{bmatrix} \begin{bmatrix} x \\ y \end{bmatrix} \quad \text{[Equation 2]}$$

Here, x and y indicate axes according to the hill climbing method on the basis of the absolute coordinate system. x' and y' indicate axes according to the hill climbing method on the basis of the relative coordinate system according to the heading angle of the robot.

Figure 3A:
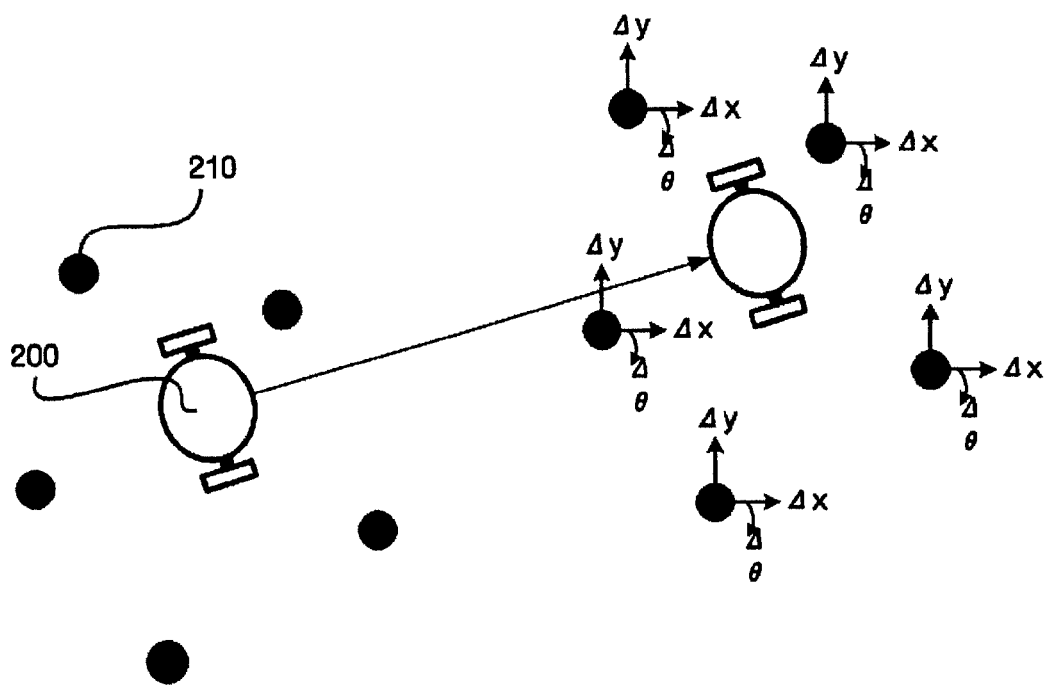
FIGS. 3A and 3B are views illustrating particles on which hill climbing is performed according to the methods shown in FIGS. 2A and 2B.
Figure 3B:
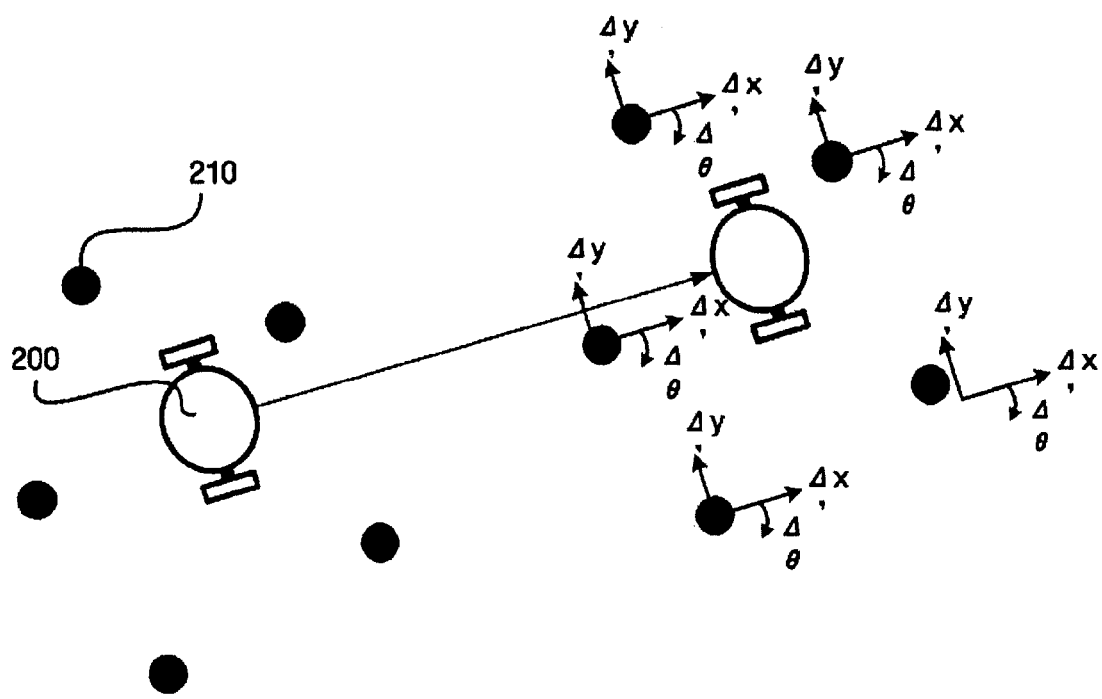

FIGS. 3A and 3B are views illustrating the pose of each of the particles 210 that is updated according to the above-described two hill climbing methods. In FIG. 3A, each of the particles 210 moves to a position by ±Δx', ±Δy, and ±Δθ' on the basis of the absolute coordinate system regardless of the heading angle of a robot 200, such that each of the particles moves in a direction where the position probability increases. On the other hand, in FIG. 3B, the hill climbing technique is performed in such a manner that each of the particles 210 moves to a position by ±Δx', ±Δy', and ±Δθ' on the basis of the relative coordinate system according to the heading angle that corresponds to the direction in which the robot 200 moves. Here, it can be seen that a step interval in a ±Δx' direction, that is, a direction in which the robot 200 proceeds, is larger than a step interval in a ±Δy' direction.

Therefore, healing climbing is applied to x-axis movement (±Δx), y-axis movement (±Δy), and rotary movement (±Δθ) (preferably, six cases of x'-axis movement ±Δx', y'-axis movement ±Δy', and rotational movement ±Δθ according to the relative coordinate system), and a score can be calculated with respect to each case by Equation 5 to be described below. The score indicates a weight that is calculated by the hill climbing. After hill climbing ends, a value having the highest score becomes a weight of a corresponding particle. The position and the heading angle of the value having the highest score become the pose of the corresponding particle.

The hill climbing may be performed several times. That is, the hill climbing is applied to the six cases, and a value corresponding to the highest score becomes the pose of the corresponding particle. This process is repeated so as to obtain the value corresponding to the highest score. As a result, after repeating the process, the value having the highest score is updated as the weight of the corresponding particle, and the position and the heading angle of the robot are updated as the pose of the corresponding particle.

After the mobile robot moves the predetermined distance, range data, which is new observation information, is obtained by the sensor 620. On the basis of the range data and the existing map information, a particle filter unit 630 predicts the probability of the pose of each of the particles and calculates the weight of each of the particles (S120).

The more similar the pose of the particle is to the current pose of the mobile robot, the higher weight the particle has. Therefore, it can be seen that when the weight is higher, the probability that the mobile robot has the pose of the particle that has the weight is high. Further, the observation information can be obtained by the sensor 620 that is provided in the mobile robot and is capable of obtaining ambient information, and in particular, recognizing the distance between the mobile robot and obstacles around the mobile robot. The sensor 620 can detect the distance between the robot and the obstacles around the robot by using an ultrasonic or ultraviolet sensor 620 or a structured light module.

The method of predicting the probability of the pose of the particle and calculating the weight by using the particle filter will be described.

The position of the mobile robot can be represented as a probability distribution. The probability distribution p can be represented by Equation 3 that uses data in the previous step (time t−1) and data in the current step (time t).

$$p(x_t^{(i)} | m_{t-1}^{(i)}, x_{t-1}^{(i)}, z_t, u_t) = \frac{p(z_t | m_{t-1}^{(i)}, x_t^{(i)}) p(x_t^{(i)} | x_{t-1}^{(i)}, u_t)}{\int p(z_t | m_{t-1}^{(i)}, x') p(x' | x_{t-1}^{(i)}, u_t) dx'} \quad \text{[Equation 3]}$$

Figure 4A:
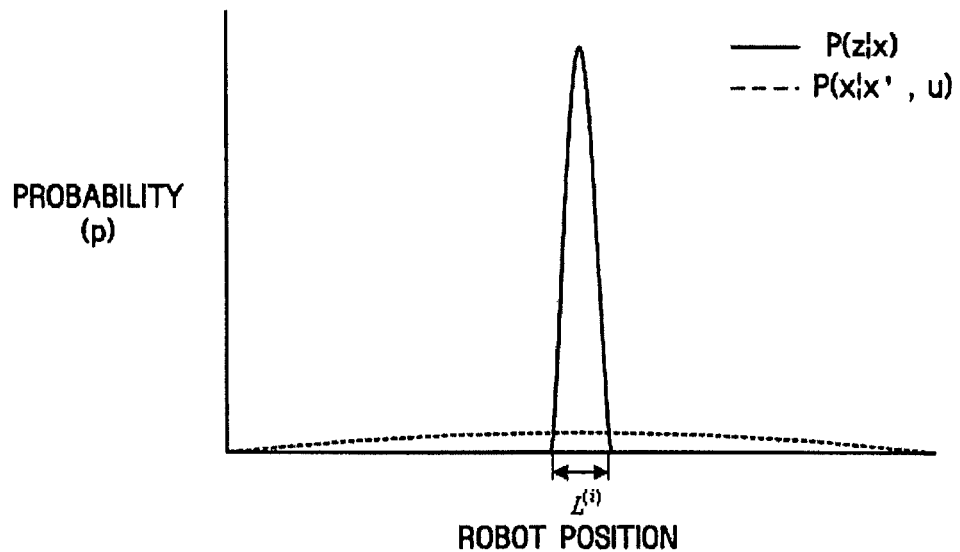
FIG. 4A a view illustrating a probability value of a pose of a robot by an odometer and the sensor when a ratio between standard deviation of accuracy of the odometer and a sensor is 30:1.

Here xt−1 indicates the pose at time t−1, ut indicates data detected by the odometer 600 at time t (present), and xt indicates the pose at the time t. mt−1 indicates data at the time t−1 on the map, and zt indicates data at the time t that is obtained by the sensor 620. The probability distribution indicates a probability distribution on the robot pose at the time t when the robot moves from the xt−1 to xt with dynamic noise or another uncertain factor, which exists in the system, included therein. The grid-based SLAM algorithm according to the related art performs a calculation by approximating Equation 3. When the accuracy of the sensor 620 is much higher than that of the odometer 600, for example, when a ratio between standard deviation of accuracy of the odometer 600 and the sensor 620 is 30:1 as shown in FIG. 4A, in an observed region $L^{(i)} = \{x | p(z_t | m_{t-1}^{(i)}, x) > \epsilon\}$, a probability value $p(z_t | m_{t-1}^{(i)}, x_t^{(i)})$ of the pose of the robot by the sensor 620 is quickly changed, while a probability value $p(x_t^{(i)} | x_{t-1}^{(i)}, u_1)$ of the pose of the robot by the odometer 600 can be approximated as a constant k. Therefore, Equation 3 can be approximately represented in Equation 4 as follows.

$$p(x_t^{(i)} | m_{t-1}^{(i)}, x_{t-1}^{(i)}, z_t, u_t) \approx \frac{p(z_t | m_{t-1}^{(i)}, x_t^{(i)})}{\int_{x' \in L^{(i)}} p(z_t | m_{t-1}^{(i)}, x') dx'} \quad \text{[Equation 4]}$$

The weight of the current particle can be approximately calculated by Equation 5 as follows.

$$w_t^{(i)} = w_{t-1}^{(i)} p(z_t \mid m_{t-1}^{(i)}, x_{t-1}^{(i)}) \quad \text{[Equation 5]}$$
$$= w_{t-1}^{(i)} \int p(z_t \mid m_{t-1}^{(i)}, x') p(x' \mid x_{t-1}^{(i)}, u_t) dx'$$
$$\approx w_{t-1}^{(i)} k \int_{x' \in L^{(i)}} p(z_t \mid m_{t-1}^{(i)}, x') dx'$$
$$\approx w_{t-1}^{(i)} k \sum_{j=1}^{l} p(z_t \mid m_{t-1}^{(i)}, x_j)$$
$$= w_{t-1}^{(i)} k \eta$$
$$\left( \text{where } \eta = \sum_{j=1}^{l} p(z_t \mid m_{t-1}^{(i)}, x_j) \right)$$

The process of measuring the pose and calculating the weight of each particle by the above-described Equation 3, Equation 4, and Equation 5 is described in detail in G. Grisetti, C. Stachniss, and W. Burgard, "Improving grid-based slam with Rao-Blackwellized particle filters by adaptive proposals and selective resampling," In Proc. of the IEEE Int. Conf. on Robotics & Automation (ICRA), pp. 2443-2448, Barcelona, Spain, 2005.

After the particle filter unit 630 measures the probability of the pose of each particle and calculates the weight of each particle by the above-described Equation 3, Equation 4, and Equation 5, the sampling unit 640 resamples the current particles on the basis of the weights (S130). When it starts with the N particles at the initial stage and the time count t increases by one, particles having lower weights are removed from the N particles. Then, particles are sampled again on the basis of particle having higher weight, such that the N particles remain constant. This is called resampling.

Then, when a gridmap is updated through map estimation, a weight adjusting unit 650 adjusts the weight in consideration of the error of the sensor 620 (S140).

An embodiment of the present invention provides a method of calculating the weight without applying the probability value $p(x_t^{(i)} \mid x_{t-1}^{(i)}, u_t)$ of the pose of the robot by the odometer 600 as the constant because the accuracy of the sensor 620 is not high. That is, the weight obtained by the above-described method is resampled and is then adjusted by a method to be described below.

Figure 4B:
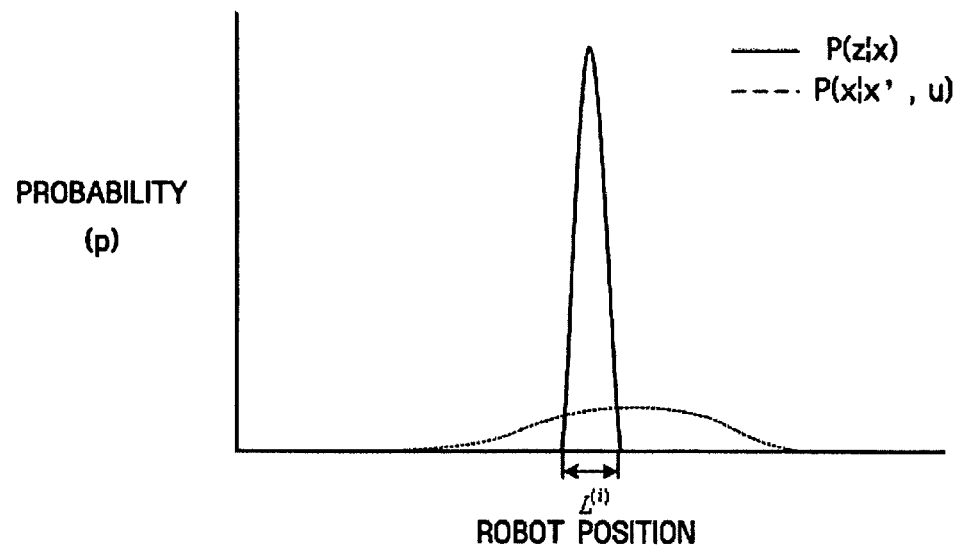
FIG. 4B is a view illustrating a probability value of a pose of a robot by an odometer and a sensor when a ratio between standard deviation of accuracy of the odometer and the sensor is 10:1.

When the accuracy of the sensor 620 is not high, the probability value of the pose by the odometer 600 cannot be approximated as a constant. That is, as shown in FIG. 4B, a ratio between standard deviation of accuracy of the odometer 600 and the sensor 620 is 10:1, the probability value $p(z_t \mid m_{t-1}^{(i)}, x_t^{(i)})$ of the pose of the robot by the odometer 600 cannot be approximated to the constant k in the observed region $L^{(i)} = \{x \mid p(z_t \mid m_{t-1}^{(i)}, x) > \epsilon\}$.

Figure 5A:
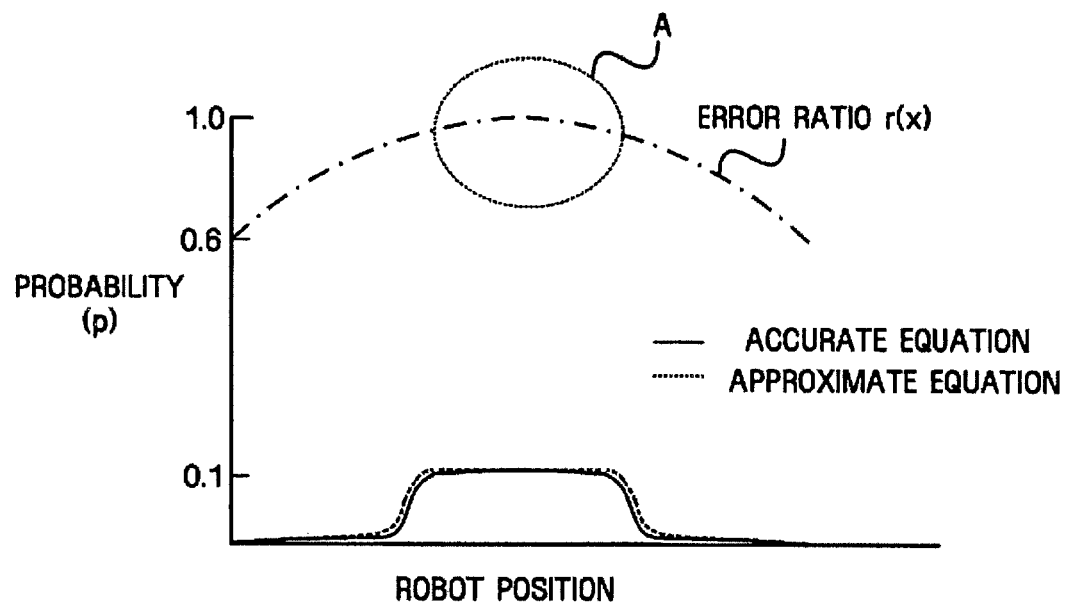
FIG. 5A is a view illustrating a probability value of a pose by an accurate equation, Equation 3, and a probability value of a pose by an approximate equation, Equation 4, and an error ratio r(x) between the accurate equation and the approximate equation when a ratio between standard deviation of accuracy of an odometer and a sensor is 30:1.
Figure 5B:
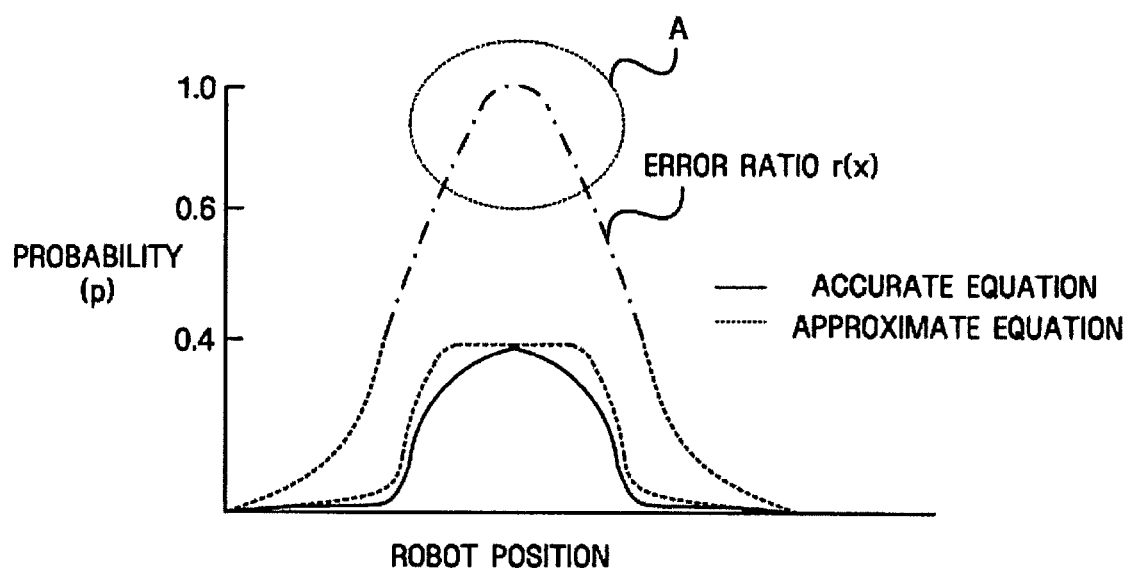
FIG. 5B is a view illustrating a probability value of a pose by an accurate equation, Equation 3, and a probability value of a pose by an approximate equation, Equation 4, and an error ratio r(x) between the accurate equation and the approximate equation when the ratio between standard deviation of accuracy of an odometer and a sensor is 10:1.

FIG. 5A is a view illustrating a probability value of a pose by an accurate equation, Equation 3, and a probability value of a pose by an approximate equation, Equation 4, and an error ratio r(x) between the accurate equation and the approximate equation when the ratio between standard deviation of accuracy of the odometer 600 and the sensor 620 is 30:1. FIG. 5B is a view illustrating a probability value of a pose by an accurate equation, Equation 3, and a probability value of a pose by an approximate equation, Equation 4, and an error ratio r(x) between the accurate equation and the approximate equation when the ratio between standard deviation of accuracy of the odometer 600 and the sensor 620 is 10:1.

In a case of 30:1, even though the probability value of the pose of the robot by the odometer 600 is set as a constant, an error is not generally generated in the vicinity (a portion A of FIG. 5A) of the estimated position of the robot, which is a period where integration is actually performed, of the robot, and it can be seen that the error ratio r(x) is nearly 1. In contrast, in a case of 10:1, since the accuracy of the sensor 620 is not relatively high, the error becomes larger. This can be seen from the fact that the error ratio r(x) distributed in FIG. 5B is comparatively largely changed in the region (a region A of FIG. 5B that is estimated as the robot position).

Therefore, the probability can be calculated in consideration of the error ratio r(x), shown in FIG. 5B, by setting the probability value of the pose of the robot by the odometer 600 as not the constant but a variable.

The following weight adjusting equation can be obtained in consideration of the error ratio r(x).

$$w_t^{(i)} = w_{t-1}^{(i)} p(z_t \mid m_{t-1}^{(i)}, x_{t-1}^{(i)}) \quad \text{[Equation 6]}$$
$$= w_{t-1}^{(i)} \int p(z_t \mid m_{t-1}^{(i)}, x') p(x' \mid x_{t-1}^{(i)}, u_t) dx'$$
$$= w_{t-1}^{(i)} k \int_{x' \in L^{(i)}} p(z_t \mid m_{t-1}^{(i)}, x') dx' \cdot r(x)$$
$$\approx w_{t-1}^{(i)} \left[ k \sum_{j=1}^{l} p(z_t \mid m_{t-1}^{(i)}, x_j) \cdot r(x_j) \right]$$
$$= w_{t-1}^{(i)} (k \eta \cdot r(x))$$

In order to efficiently perform weight adjustment, Equation 6 is converted into a log equation as shown in Equation 7.

$$\log w_t^{(i)} = \log w_{t-1}^{(i)} + \log(k\eta) + \log r(x) \quad \text{[Equation 7]}$$
$$= \log w_{t-1}^{(i)} + \log(k\eta) - R(x)$$

When the log equation converted from Equation 5 is compared with Equation 7, the R(x) size is subtracted in Equation 7. This is an amount generated when the error of the sensor 620 is relatively large, and the shape and size of the R(x) may be changed according to an error characteristic of each sensor 620.

Figure 6:
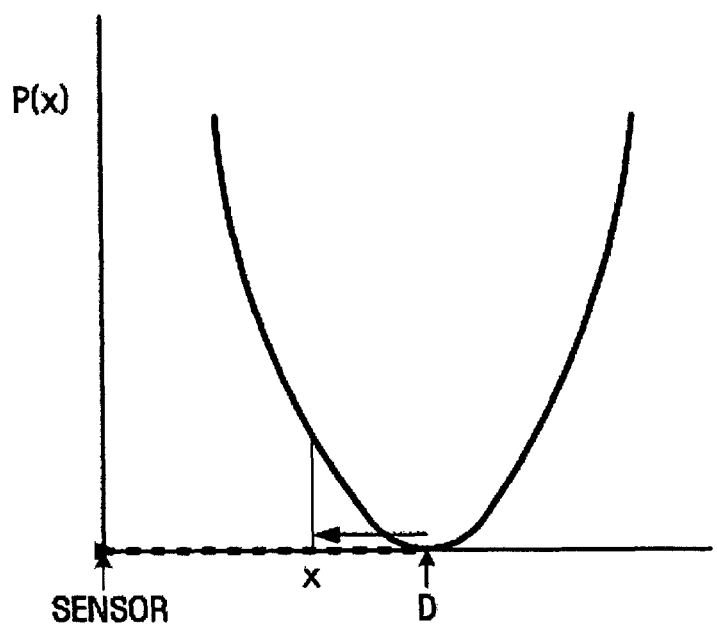
FIG. 6 is a graph illustrating P(x) that indicates a function that re-adjusts a weight according to an error characteristic by a sensor according to an exemplary embodiment.

Here, R(x) in Equation 7 can be expressed in multiplication between P(x) and grid cell occupancy cj. The shape of P(x) shown in Equation 8 to be described below describes a parabola along a gridline, which connects the sensor 620 and the region detected by the sensor 620, as shown in FIG. 6. Of course, the shape and value of the graph of FIG. 6, which illustrates P(x) in Equation 8, may be variously changed according to the sensor 620.

$$R(x) = \sum_{j=0}^{m} c_j \cdot P(x) \quad \text{[Equation 8]}$$
$$P(x) = \begin{cases} \mu(x-D)^2 & \text{if } x \in L^{(i)} \\ 0 & \text{otherwise} \end{cases}$$

In Equation 8, m is a value that depends on the accuracy of the sensor 620, and cj is a grid cell occupancy value between zero and one. Further, x indicates the distance to a grid point on the map, which each particle has in respects to the pose, and D indicates the distance to a grid point that is measured by the sensor 620 of the current mobile robot. Therefore, when grid-point data of the current mobile robot that is measured by the sensor 620 is right and the pose of each particle is close to the actual pose of the mobile robot, there is almost no difference between the value x and the valued D. As a result, the value P(x) and the value R(x) become smaller. In contrast, when the pose, which each particle has, is not similar to the actual pose of the current mobile robot, there is big difference between the value x and the value D. As a result, the value P(x) and the value R(x) become larger. This is called a map consistency check.

The value R(x) is checked by performing the map consistency check with respect to every particle, such that the weight of each particle can be adjusted. The weight adjustment on each particle is performed when updating the gridmap. Therefore, calculation time is not increased.

The above-described processes are repeated to thereby estimate the pose of the robot that is moving.

Figure 7:
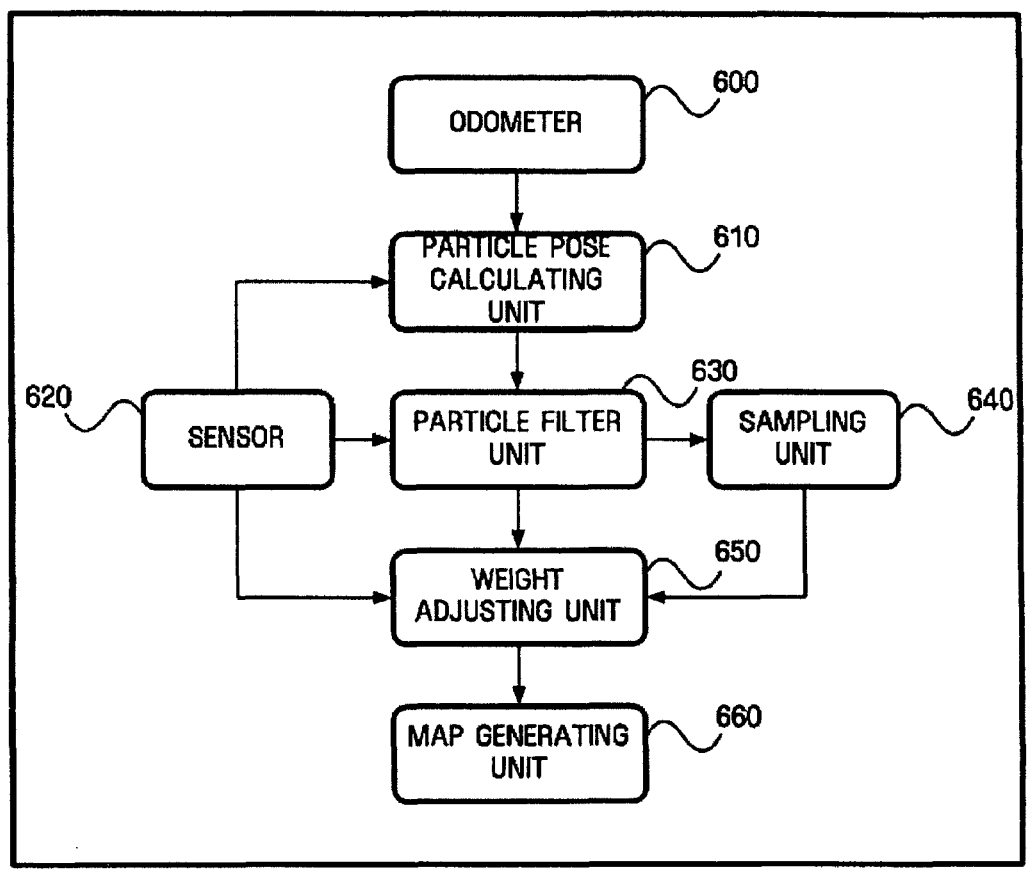
FIG. 7 is a block diagram of an apparatus for estimating a pose of a mobile robot using a particle filter according to an exemplary embodiment.

FIG. 7 is a block diagram of an apparatus for estimating a pose of a mobile robot using a particle filter according to an embodiment of the present invention.

An apparatus for estimating a mobile robot using a particle filter according to an embodiment of the present invention includes an odometer 600, a particle pose calculating unit 610, a sensor 620, a particle filter unit 630, a weight adjusting unit 650, a sampling unit 640, a map generating unit 660, and the like.

The odometer 600 detects a change in pose of the mobile robot. The odometer 600 may include, for example, an encoder or a gyroscope.

The particle pose calculating unit 610 obtains a pose of each particle on the basis of the change in pose that is detected by the odometer 600. At this time, it is preferable that the pose of each particle be updated in a direction where the position probability of each particle increases according to the hill climbing technique according to the related art or the hill climbing technique in which directions along coordinate axes and the step sizes are changed according to the heading angle of the robot.

The sensor 620 is provided outside the mobile robot and acquires range data by using observation information, and in particular, by recognizing the distance between the robot and obstacles around the robot. In the embodiment of the present invention, a structured light sensor that has relatively low accuracy may be used as the sensor 620.

The particle filter unit 630 predicts the probability of the pose of the current particles and obtains the weights of the current particles on the basis of the range data acquired by the sensor 620 and map information.

The weight adjusting unit 650 adjusts the weights obtained by the particle filter unit 630 in consideration of the error of the sensor 620. At this time, the weights can be adjusted by using an error characteristic value that is previously defined according to the sensor 620 on the basis of the distance on the map at the position of the current particle and the distance measured by the sensor 620.

The sampling unit 640 samples particles on the basis of an initial position of the mobile robot. After the robot moves, the sample unit 640 resamples particles on the basis of the weights obtained by the particle filter unit 630. At this time, when the particles are resampled, particles having lower weights are removed from the particles and the particles are sampled on the basis of particles having higher weights.

The map generating unit 660 generates a map and updates the map on the basis of the range data obtained by the sensor 620 while the robot is moving.

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. The medium/media may also be a distributed network, so that the computer readable code/instructions are stored/transferred and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein when used in connection with execution of code/instructions, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

According to the method, apparatus, and medium for estimating a pose of a mobile robot using a particle filter, the following effects can be obtained.

First, even though a cheap sensor having relatively low accuracy is used, the pose of the mobile robot can still be estimated with high accuracy by the grid-based SLAM algorithm using the particle filter.

Second, the calculation time and position errors can be reduced by performing the hill climbing technique in consideration of the heading angle of the robot.

Although a few exemplary embodiments have been shown and described, it would be appreciated by those skilled in the art that changes may be made in these exemplary embodiments, the scope of embodiments being defined in the claims and their equivalents.

What is claimed is:

1. A method for estimating a pose of a mobile robot using a particle filter, the method comprising:
   sampling current particle on basis of initial position of the mobile robot;
   detecting a change in pose of the mobile robot and calculating pose of the current particle by applying the detected change in pose to a previous particle;
   predicting the probability of the pose of the current particle and obtaining a weight of the current particle on the basis of range data obtained by a sensor and map information;
   resampling the current particle on the basis of the weight; and
   adjusting the weight in consideration of an error of the sensor,
   wherein the detecting of the change in pose of the mobile robot and the calculating of the pose of the current particle by applying the detected change in pose to the previous particle comprises updating the pose of the current particle in a direction where the position probability increases by using a hill climbing method, and
   wherein the probability is a variable which is calculated using an error ratio based on accuracy of the sensor.

2. The method of claim 1, wherein the detecting of the change in pose of the mobile robot and the calculating of the pose of the current particle by applying the detected change in pose to the previous particle comprises updating the pose of the current particle in a direction where the position probability increases by using a hill climbing method on the basis of a relative coordinate system according to a heading angle of the mobile robot.

3. The method of claim 2, wherein the hill climbing method causes a step size to be changed adaptively to an error covariance ellipse of the odometer model that detects the change in pose such that the step size increases in a direction where the robot proceeds.

4. The method of claim 1, wherein the adjusting of the weight in consideration of the error by the sensor, the weight is adjusted according to an error characteristic value that is defined on the basis of the distance on the map at the position of the current particle and the distance measured by the sensor.

5. The method of claim 1, wherein the change in pose is detected by an encoder or a gyroscope.

6. The method of claim 1, wherein the pose includes coordinate values in a two-dimensional coordinate system on the plane and a heading angle.

7. The method of claim 1, wherein the sensor comprises a structured light sensor.

8. The method of claim 1, wherein the resampling removes a particle having the low weight and performs a sampling operation on the basis of a particle having the high weight.

9. An apparatus for estimating a pose of a mobile robot using a particle filter, the apparatus comprising:
   an odometer to detect a change in pose of the mobile robot;
   a particle pose calculating unit to calculate pose of the current particle by applying the detected change in pose to the previous particle;
   a particle filter unit to predict the probability of the pose of the current particle and to obtain a weight of the current particle on the basis of the range data by a sensor and map information; and
   a weight adjusting unit to adjust the weight in consideration of an error by the sensor,
   wherein the particle pose calculating unit updates the pose of the current particle in a direction where the position probability increases by using a hill climbing method, and
   wherein the probability is a variable which is calculated using an error ratio between standard deviation of accuracy of the odometer and the sensor.

10. The apparatus of claim 9, wherein the particle pose calculating unit updates the pose of the current particle in a direction where the position probability increases by using a hill climbing method on the basis of a relative coordinate system according to a heading angle of the mobile robot.

11. The apparatus of claim 10, wherein the hill climbing method causes a step size to be changed adaptively to an error covariance ellipse of the odometer model that detects the change in pose such that the step size increases in a direction where the robot proceeds.

12. The apparatus of claim 9, wherein the sensor comprises a structured light sensor.

13. The apparatus of claim 9, wherein the weight adjusting unit adjusts the weight according to an error characteristic value that is defined on the basis of the distance on the map at the position of the current particle and the distance measured by the sensor.

14. The apparatus of claim 9 wherein the odometer comprises an encoder or a gyroscope.

15. The apparatus of claim 9, wherein the pose includes coordinate values in a two-dimensional coordinate system on the plane and a heading angle.

16. The apparatus of claim 9, further comprising: a map generating unit to generate the map on the basis of the range data.

17. The apparatus of claim 9, further comprising: a sampling unit to sample the particle on the basis of an initial position of the mobile robot and resampling the particle on the basis of the weight that is obtained by the particle filter unit.

18. The apparatus of claim 17, wherein the resampling removes a particle having the low weight and performs a sampling operation on the basis of a particle having the high weight.

19. At least one computer readable medium storing computer readable instructions that control at least one processor to implement the method of claim 1.

* * * * *